DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 8, 1970

878 O.G. 241

T878,010

USE OF ORGANIC ACIDS AND ACID DERIVATIVES AS ANTIFOGGANTS IN SILVER HALIDE EMULSIONS

Dorothy J. Beavers, % Eastman Kodak Co., Kodak Park Works, Rochester, N.Y. 14650

Filed Mar. 9, 1970, Ser. No. 17,879
**Int. Cl. G03c *1/34***
U.S. Cl. 96—109
No Drawing. 35 Pages Specification

Organic acids and acid derivatives are effective antifoggants for silver halide photographic emulsions. Examples indicate that a higher degree of antifoggant capability results from the use of these compounds than would be expected from the lowering of the pH of the emulsion resulting from such compounds. Effective antifoggants include organic acids, anhydrides, imides, esters, and polymers thereof, containing free carboxy, sulfonic, or phosphate groups, or groups which will cleave to form free carboxy, sulfonic, or phosphate groups. Specific examples found effective include benzoic acid, 3,4,5-trimethoxycinnamic acid, 1 - bromo-3,3 - dimethylcyclobutane carboxylic acid, quinic acid, octric acid, homoisophthalic acid, maleic anhydride, N - hydroxysuccinimide, N - hydroxyphthalimide, 3-sulfolamylsulfonic acid, ammonium salt; mono-n-octadecylphosphate, 3,4-epoxysulfolane, hydroxyhydroquinone triacetate, and copoly(methacrylate; acrylic acid) (10:90 ratio).